(12) United States Patent
Hagiwara et al.

(10) Patent No.: US 11,404,187 B2
(45) Date of Patent: Aug. 2, 2022

(54) MAGNETIC MATERIAL, PERMANENT MAGNET, ROTARY ELECTRIC MACHINE, AND VEHICLE

(71) Applicant: KABUSHIKI KAISHA TOSHIBA, Tokyo (JP)

(72) Inventors: Masaya Hagiwara, Yokohama Kanagawa (JP); Shinya Sakurada, Tokyo (JP); Keiko Okamoto, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 356 days.

(21) Appl. No.: 16/283,877

(22) Filed: Feb. 25, 2019

(65) Prior Publication Data

US 2020/0090845 A1 Mar. 19, 2020

(30) Foreign Application Priority Data

Sep. 14, 2018 (JP) .............................. JP2018-172455

(51) Int. Cl.
*H01F 1/057* (2006.01)
*H01F 1/053* (2006.01)
(Continued)

(52) U.S. Cl.
CPC ......... *H01F 1/0577* (2013.01); *C22C 38/005* (2013.01); *H01F 1/0536* (2013.01); *H01F 7/021* (2013.01)

(58) Field of Classification Search
None
See application file for complete search history.

(56) References Cited

U.S. PATENT DOCUMENTS 5,480,495 A * 1/1996 Sakurada ................ H01F 1/055
148/301
10,250,085 B2 * 4/2019 Hagiwara ............... H01F 1/055
(Continued)

FOREIGN PATENT DOCUMENTS

JP 58-022348 2/1983
JP 02-259038 10/1990
(Continued)

OTHER PUBLICATIONS

Miyamasu, et al. "A Study on Improvement in Permanent Magnet Synchronous Motor with High Permeability Magnet", IEEJ Transactions Industry Applications, 2013, vol. 133, No. 9. pp. 943-951.

*Primary Examiner* — Xiaowei Su
(74) *Attorney, Agent, or Firm* — Amin, Turocy & Watson, LLP (57) ABSTRACT

A magnetic material is expressed by a composition formula 1: $(R_{1-x}Y_x)_a M_b T_c Zn_d$. R is at least one element selected from the group consisting of rare-earth elements, M is Fe or Fe and Co, T is at least one element selected from the group consisting of Ti, V, Nb, Ta, Mo, and W, x is a number satisfying $0.01 \leq x \leq 0.8$, a is a number satisfying $4 \leq a \leq 20$ atomic percent, b is a number satisfying b=100−a−c−d atomic percent, c is a number satisfying $0 < c < 7$ atomic percent, and d is a number satisfying $0.01 \leq d \leq 7$ atomic percent. The magnetic material includes: a main phase having a $ThMn_{12}$ crystal phase; and a sub phase containing 50 atomic percent or more of Zn.

22 Claims, 5 Drawing Sheets

(51) Int. Cl.
    *H01F 7/02*         (2006.01)
    *C22C 38/00*     (2006.01)

(56)              References Cited

U.S. PATENT DOCUMENTS

| | | | |
|---|---|---|---|
| 10,490,325 | B2* | 11/2019 | Hagiwara ............. H01F 1/0593 |
| 10,923,255 | B2* | 2/2021 | Sanada ................... H01F 1/055 |
| 2001/0020495 | A1 | 9/2001 | Mei et al. |
| 2014/0349099 | A1* | 11/2014 | Kawashita ............ C22C 38/005 |
| | | | 428/220 |
| 2017/0178772 | A1 | 6/2017 | Sakuma et al. |
| 2018/0062455 | A1* | 3/2018 | Hagiwara ............... H01F 1/055 |
| 2019/0189315 | A1* | 6/2019 | Hagiwara ............... H01F 1/055 |
| 2020/0075203 | A1* | 3/2020 | Hagiwara ............. H01F 1/0557 |

FOREIGN PATENT DOCUMENTS

| | | |
|---|---|---|
| JP | 05-021217 | 1/1993 |
| JP | 05-114507 | 5/1993 |
| JP | 06-283316 | 10/1994 |
| JP | 10-041116 | 2/1998 |
| JP | 2001-189206 | 7/2001 |
| JP | 2008-029148 | 2/2008 |
| JP | 2008-043172 | 2/2008 |
| JP | 2017-112300 | 6/2017 |
| JP | 2017-175136 | 9/2017 |
| JP | 2018-103211 | 7/2018 |
| JP | 2018-125512 | 8/2018 |
| JP | 2019-044259 | 3/2019 |
| JP | 2019-167555 | 10/2019 |
| JP | 2019-169507 | 10/2019 |
| WO | 2016/162990 | 10/2016 |

* cited by examiner

MAGNETIC MATERIAL, PERMANENT MAGNET, ROTARY ELECTRIC MACHINE, AND VEHICLE

CROSS REFERENCE TO RELATED APPLICATION

This application is based upon and claims the benefit of priority from Japanese Patent Application No. 2018-172455, filed on Sep. 14, 2018; the entire contents of which are incorporated herein by reference.

FIELD

Embodiments described herein generally relate to a magnetic material, a permanent magnet, a rotary electric machine, and a vehicle.

BACKGROUND

Permanent magnets are used for products in a wide field including, for example, rotary electric machines such as a motor and a generator, electrical apparatuses such as a speaker and a measuring device, and vehicles such as an automobile and a railroad vehicle. In recent years, reduction in size of the above-described products has been demanded, and high-performance permanent magnets with high magnetization and high coercive force have been desired.

As examples of high-performance permanent magnets, there can be cited rare-earth magnets such as Sm—Co based magnets and Nd—Fe—B based magnets, for example. In these magnets, Fe and Co contribute to increase in saturation magnetization. Further, these magnets contain rare-earth elements such as Nd and Sm, which bring about a large magnetic anisotropy which is derived from a behavior of 4f electrons of the rare-earth elements in a crystal field. Consequently, it is possible to obtain a large coercive force.

DETAILED DESCRIPTION

A magnetic material of an embodiment is expressed by a composition formula 1: $(R_{1-x}Y_x)_a M_b T_c Zn_d$. R is at least one element selected from the group consisting of rare-earth elements, M is Fe or Fe and Co, T is at least one element selected from the group consisting of Ti, V, Nb, Ta, Mo, and W, x is a number satisfying $0.01 \leq x \leq 0.8$, a is a number satisfying $4 \leq a \leq 20$ atomic percent, b is a number satisfying $b=100-a-c-d$ atomic percent, c is a number satisfying $0 < c < 7$ atomic percent, and d is a number satisfying $0.01 \leq d \leq 7$ atomic percent. The magnetic material includes a main phase having a $ThMn_{12}$ crystal phase, and a sub phase containing 50 atomic percent or more of Zn.

Hereinafter, embodiments will be explained with reference to the drawings. Note that the drawings are schematic, and for example, a relation between a thickness and a plane dimension, a ratio of thicknesses of the respective layers, and the like are sometimes different from actual ones. Moreover, in the embodiments, substantially the same components are denoted by the same reference signs, and explanations thereof are omitted.

First Embodiment

A magnetic material of an embodiment contains a rare-earth element, an element M (M is Fe or Fe and Co), and an element X (X is at least one element selected from the group consisting of Zn, Cu, Sn, In, and Ga).

Figure 1:
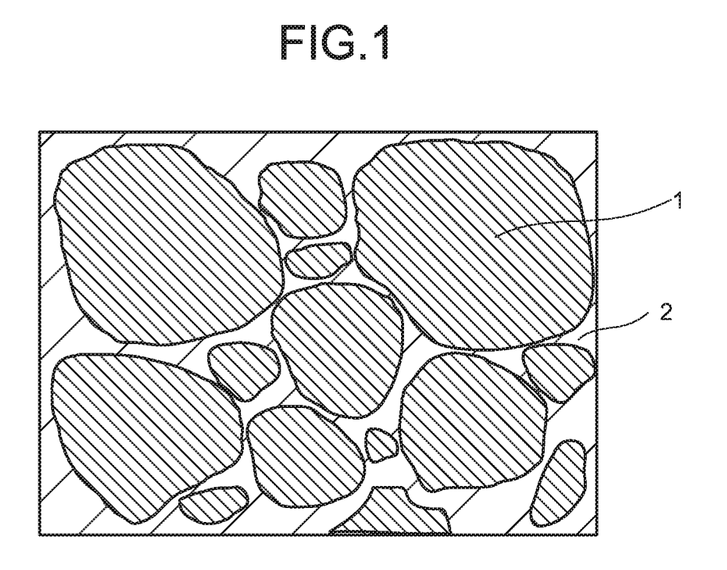
FIG. 1 is a cross-sectional schematic view illustrating a structural example of a metal structure.

The above-described magnetic material includes a metal structure having a main phase. FIG. 1 is a cross-sectional schematic view illustrating a structural example of the metal structure. The above-described magnetic material includes a metal structure having crystal phases each containing the high-concentration element M as main phases 1. Saturation magnetization can be improved by increasing a concentration of the element M in the main phase 1. The main phases are phases having the highest volume occupancy ratio among each crystal phase and amorphous phase in the magnetic material. The sub phases 2 are phases having a volume occupancy ratio lower than that of the main phases 1.

As the crystal phase containing the high-concentration element M, there can be cited, for example, a $ThMn_{12}$ crystal phase. The $ThMn_{12}$ crystal phase has a crystal structure of tetragonal system. In the magnetic material having the $ThMn_{12}$ crystal phase as its main phase 1, the high saturation magnetization can be obtained due to the high concentration element M. However, it is difficult to obtain the high coercive force only by the main phase 1.

In the magnetic material of the embodiment, formation of a magnetization-reversal nucleus of the main phase 1 is suppressed, an inverse domain propagation between proximal main phases 1 is suppressed, to thereby improve the coercive force by forming the sub phase 2 containing the element X while controlling a concentration of each element contained in the main phase 1 to stably form the main phase 1 enabling high saturation magnetization.

In the magnetic material having the $ThMn_{12}$ crystal phase as its main phase 1, since the concentration of the element M is high, at least one hetero-phase selected from the group consisting of an α-Fe phase and an α-(Fe, Co) phase is likely to precipitate. When the hetero-phase is precipitated, the concentration of the element M in the main phase is lowered, which causes reduction in saturation magnetization of the main phase 1. Further, the precipitation of the hetero-phase causes reduction in coercive force of the permanent magnet. A total amount of the hetero-phase is preferably 10 volume percent or less, for example.

The magnetic material of the embodiment is expressed by a composition formula: $(R_{1-x}Y_x)_a M_b T_c X_d$ (in the formula, R is at least one element selected from the group consisting of rare-earth elements, M is Fe or Fe and Co, T is at least one element selected from the group consisting of Ti, V, Nb, Ta, Mo, and W, X is at least one element selected from the group consisting of Zn, Cu, Sn, In, and Ga, x is a number satisfying $0.01 \leq x \leq 0.8$, a is a number satisfying $4 \leq a \leq 20$ atomic percent, b is a number satisfying $b=100-a-c-d$ atomic percent, c is a number satisfying $0 < c < 7$ atomic percent, and d is a number satisfying $0.01 \leq d \leq 7$ atomic percent). Note that the magnetic material may contain inevitable impurities.

Yttrium (Y) is an element effective for stabilization of the $ThMn_{12}$ crystal phase. Specifically, the element Y can mainly increase stability of the $ThMn_{12}$ crystal phase through, for example, reduction in a crystal lattice caused when it is replaced with the element R in the main phase 1. When an addition amount of the element Y is too small, it is not possible to sufficiently achieve an effect of increasing the stability of the $ThMn_{12}$ crystal phase. When the addition amount of Y is too large, an anisotropic magnetic field of the magnetic material significantly lowers. It is preferable that x is a number satisfying $0.01 \leq x \leq 0.8$, it is more preferable that x is a number satisfying $0.05 \leq x < 0.5$, and it is still more preferable that x is a number satisfying $0.1 \leq x \leq 0.4$.

50 atomic percent or less of the element Y may be replaced with at least one element selected from the group consisting of zirconium (Zr) and hafnium (Hf). The element Zr and the element Hf are elements effective for stabilization of the crystal phase.

The element R is a rare-earth element, and an element capable of providing large magnetic anisotropy to the magnetic material, and giving high coercive force to a permanent magnet. The element R is, concretely, at least one element selected from the group consisting of lanthanum (La), cerium (Ce), praseodymium (Pr), neodymium (Nd), promethium (Pr), samarium (Sm), europium (Eu), gadolinium (Gd), terbium (Tb), dysprosium (Dy), holmium (Ho), erbium (Er), thulium (Tm), ytterbium (Yb), and lutetium (Lu), and it is particularly preferable to use Sm. For example, when a plurality of elements including Sm are used as the element R, by setting the Sm concentration to 50 atomic percent or more of all of the elements capable of being applied as the element R, it is possible to increase the performance, for example, the coercive force of the magnetic material.

An addition amount a of the element R and the element Y is preferably a number satisfying $4 \leq a \leq 20$ atomic percent, for example. When the addition amount a is less than 4 atomic percent, a large amount of hetero-phase precipitates, which lowers the coercive force. When the addition amount a exceeds 20 atomic percent, the sub phase 2 increases, which lowers the saturation magnetization of the entire magnetic material. The addition amount a of the element R and the element Y is more preferably a number satisfying $5 \leq a \leq 18$ atomic percent, and still more preferably a number satisfying $7 \leq a \leq 15$ atomic percent.

The element M is Fe or Fe and Co, and is an element responsible for high saturation magnetization of the magnetic material. When compared between Fe and Co, Fe causes higher magnetization, so that Fe is an essential element, and 30 atomic percent or more of the element M is Fe. By making the element M contain Co, the Curie temperature of the magnetic material increases, resulting in that the reduction in the saturation magnetization in a high-temperature region can be suppressed. Further, by adding a small amount of Co, the saturation magnetization can be further increased, when compared to a case where Fe is solely used. On the other hand, if a Co ratio is increased, the reduction in the anisotropic magnetic field is caused. Besides, if the Co ratio is too high, the reduction in the saturation magnetization is also caused. For this reason, by appropriately controlling the ratio between Fe and Co, it is possible to simultaneously realize high saturation magnetization, high anisotropic magnetic field, and high Curie temperature. When M in the composition formula is represented as $(Fe_{1-y}Co_y)$, a desirable value of y is $0.01 \leq y < 0.7$, the value is more preferably $0.01 \leq y < 0.5$, and still more preferably $0.01 \leq y \leq 0.3$. 20 atomic percent or less of the element M may be replaced with at least one element selected from the group consisting of aluminum (Al), silicon (Si), chromium (Cr), manganese (Mn), nickel (Ni), and gallium (Ga). The above-described elements contribute to growth of crystal grains which form the main phase 1, for example.

The element T is at least one element selected from the group consisting of titanium (Ti), vanadium (V), niobium (Nb), tantalum (Ta), molybdenum (Mo), and tungsten (W), for example. By adding the element T, it is possible to stabilize the $ThMn_{12}$ crystal phase. However, by the introduction of the element T, the concentration of the element M is lowered, resulting in that the saturation magnetization of the magnetic material is likely to be lowered. In order to increase the concentration of the element M, it is only required to reduce the addition amount of the element T, but, in such a case, the stability of the $ThMn_{12}$ crystal phase is lost, and the hetero-phase precipitates, which leads to reduction in the coercive force of the magnetic material. The addition amount c of the element T is preferably a number satisfying $0 < c < 7$ atomic percent. Consequently, it is possible to stabilize the $ThMn_{12}$ crystal phase while suppressing the precipitation of the hetero-phase. It is more preferable that 50 atomic percent or more of the element T is Ti or Nb. By using Ti or Nb, even if the content of the element T is reduced, it is possible to greatly reduce the precipitation amount of the hetero-phase while stabilizing the $ThMn_{12}$ crystal phase.

In order to further improve the saturation magnetization of the magnetic material, the addition amount of the element T is preferably small. However, when the addition amount of the element T is small, a $Nd_3(Fe, Ti)_{29}$ crystal phase is likely to precipitate, which sometimes reduces the saturation magnetization on the contrary. In order to suppress the precipitation of the $Nd_3(Fe, Ti)_{29}$ crystal phase even when the addition amount of the element T is small, it is effective to increase the addition amount of Y. This enables to realize high saturation magnetization. For example, if the addition amount c of the element T is a number satisfying $0 < c < 4.5$ atomic percent, x is preferably a number satisfying $0.1 < x < 0.6$. If c is a number satisfying $1.5 < c < 4$ atomic percent, x is preferably a number satisfying $0.15 < x \leq 0.55$. If c is a number satisfying $3 < c \leq 3.8$ atomic percent, x is preferably a number satisfying $0.3 < x \leq 0.5$.

The element X reacts with the main phase 1 to form the element X-rich sub phase 2. The element X is at least one element selected from the group consisting of zinc (Zn), copper (Cu), tin (Sn), indium (In), and gallium (Ga), for example. By adding the element X, it is possible to form the sub phase 2 containing the element X, and to improve the coercive force. However, since the element X is a nonmagnetic element, by the introduction of a lot of element X, the saturation magnetization of the magnetic material is likely to be lowered. An addition amount d of the element X is preferably a number satisfying $0.01 \leq d \leq 7$ atomic percent. This makes it possible to increase the coercive force while increasing the saturation magnetization of the magnetic material. The addition amount d is more preferably $0.015 \leq d \leq 3$ atomic percent, and still more preferably $0.02 \leq d \leq 1$ atomic percent. It is particularly preferable to use Zn as the element X. For example, when a plurality of elements including Zn are used as the element X, by setting the Zn concentration to 50 atomic percent or more of all of the elements capable of being applied as the element X, it is possible to increase the performance, for example, the coercive force of the magnetic material.

The magnetic material of the embodiment may further contain an element A. The element A is at least one element selected from the group consisting of nitrogen (N), carbon (C), boron (B), hydrogen (H), and phosphorus (P). At this time, a composition of the magnetic material is expressed by a composition formula: $(R_{1-x}Y_x)_aM_bT_cX_dA_e$ (in the formula, R is at least one element selected from the group consisting of rare-earth elements, M is Fe or Fe and Co, T is at least one element selected from the group consisting of Ti, V, Nb, Ta, Mo, and W, X is at least one element selected from the group consisting of Zn, Cu, Sn, In, and Ga, A is at least one element selected from the group consisting of N, C, B, H, and P, x is a number satisfying $0.01 \leq x \leq 0.8$, a is a number satisfying $4 \leq a \leq 20$ atomic percent, b is a number satisfying b=100−a−c−d−e atomic percent, c is a number satisfying $0 < c < 7$ atomic percent, d is a number satisfying $0.01 \leq d \leq 7$ atomic percent, and e is a number satisfying $0 < e \leq 18$ atomic percent).

The element A has a function of entering a crystal lattice of the $ThMn_{12}$ crystal phase to cause at least one of enlargement of the crystal lattice and change in electronic structure, for example. Consequently, it is possible to change the Curie temperature, the magnetic anisotropy, and the saturation magnetization. The element A does not always have to be added, except for inevitable impurities.

When 50 atomic percent or more of the element R is Sm (when a main component of the element R is Sm), the magnetic anisotropy of the $ThMn_{12}$ crystal phase changes from a c axis direction to a direction oriented in a plane perpendicular to the c axis due to the entrance of the element A, which reduces the coercive force. For this reason, it is preferable that the element A is not added except for inevitable impurities. On the contrary, when 50 atomic percent or more of the element R is at least one element selected from the group consisting of Ce, Pr, Nd, Tb, and Dy (when the main component of the element R is at least one element selected from the group consisting of Ce, Pr, Nd, Tb, and Dy), the magnetic anisotropy of the $ThMn_{12}$ crystal phase changes from the direction oriented in the plane perpendicular to the c axis to the c axis direction due to the entrance of the element A, which enables to increase the coercive force. For this reason, the element A is preferably added. When e exceeds 18 atomic percent, the stability of the $ThMn_{12}$ crystal phase is lowered. It is more preferable that e is a number satisfying $0 < e \leq 14$ atomic percent. Note that when 50 atomic percent or more of the element R is at least one element selected from the group consisting of Ce, Pr, Nd, Tb, and Dy, and composed of a plurality of elements, there is a case where each of the plurality of elements is 50 atomic percent or more and there is a case where a total of the plurality of elements is 50 atomic percent or more. For example, even a case where 30 atomic percent of Ce, 15 atomic percent of Pr, and 5 atomic percent of Nd are contained, satisfies the configuration that 50 atomic percent or more of the element R is at least one element selected from the group consisting of Ce, Pr, Nd, Tb, and Dy.

The magnetic material having the $ThMn_{12}$ crystal phase as the main phase 1 exerts the coercive force according to a new creation type coercive force mechanism where the magnetization-reversal nucleus is generated at a part of crystal grains, and an inverse domain area is propagated to other crystal grains to be demagnetized. In order to increase the coercive force, at least one of suppression of the generation of the magnetization-reversal nucleus and suppression of the propagation of the inverse domain area of the main phase 1 is effective. The magnetic material of the embodiment has the sub phase 2 containing the element X, and it is possible to improve the coercive force owing to the sub phase 2 taking charge of the aforementioned function.

In order to effectively suppress the inverse domain propagation between the main phases 1 by the sub phase 2, the sub phase 2 preferably has non-ferromagnetism, and more preferably has non-magnetism. If the non-magnetic element is selected as the element X, it is possible to weaken the magnetism of the sub phase 2 by increasing a concentration of the element X of the sub phase 2. Zn which is particularly preferable as the element X is a non-magnetic element. The concentration of the element X of the sub phase 2 is preferably 10 atomic percent or more. Although an upper limit of the concentration of the element X of the sub phase 2 is not particularly limited, it is 95 atomic percent or more, for example. When the sub phase 2 contains Zn, the Zn concentration is preferably 50 atomic percent or more. The Zn concentration is more preferably 55 atomic percent or more, and still more preferably 60 atomic percent or more.

In order to suppress the generation of the magnetization-reversal nucleus of the main phase 1 by the sub phase 2, it is important to control a shape of a surface of the main phase 1, namely, an interface between the main phase 1 and the sub phase 2. When the magnetization-reversal nucleus is generated at the main phase 1, it can be considered that the reversal nucleus is generated by a demagnetizing field at the surface of the main phase 1. In order to suppress this, it is preferable that the surface of the main phase 1 is smooth with a small number of depressions and projections. When the element X reacts with the constituent element of the main phase 1 to form the sub phase 2, an interface between the main phase 1 and the sub phase 2 is reconfigured, and it becomes an interface which is flatter than that before forming the sub phase 2. Consequently, it is possible to suppress the generation of the magnetization-reversal nucleus at the interface between the main phase 1 and the sub phase 2.

Figure 2:
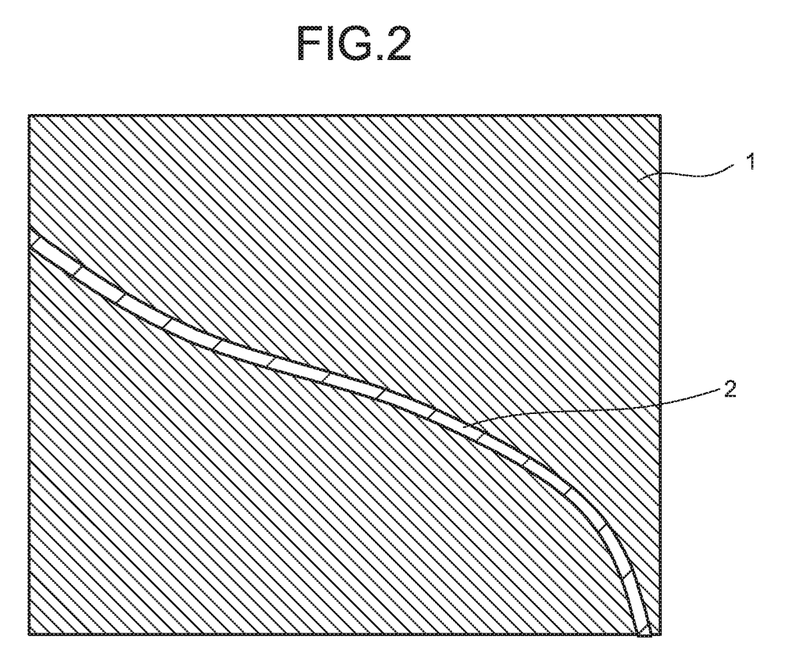
FIG. 2 is a schematic view illustrating an interface between a main phase 1 and a sub phase 2, the interface having a small number of depressions and projections.
Figure 3:
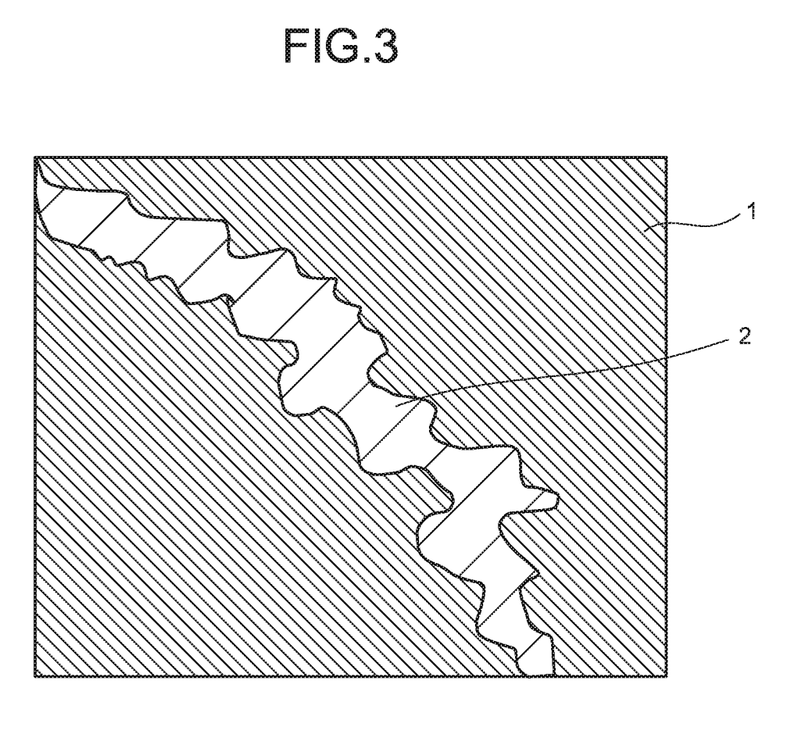
FIG. 3 is a schematic view illustrating an interface between a main phase 1 and a sub phase 2, the interface having a large number of depressions and projections.

FIG. 2 is a schematic view illustrating an interface between the main phase 1 and the sub phase 2, where the number of depressions and projections is small. FIG. 3 is a schematic view illustrating an interface between the main phase 1 and the sub phase 2, where the number of depressions and projections is large. An average value of the number of depressions and projections at the interface between the main phase 1 and the sub phase 2 is preferably 500 or less, more preferably 250 or less, still more preferably 100 or less, and even more preferably 50 or less. In order to smooth the interface between the sub phase 2 and the main phase 1, the sub phase 2 is preferably generated by the reaction between the main phase 1 and the element X. For this reason, the sub phase 2 preferably contains the element R being the constituent element of the main phase. A concentration of the element R is preferably 1 atomic percent or more, and more preferably 1.5 atomic percent or more. Although an upper limit of the concentration of the element R is not particularly limited, it is 90 atomic percent or more, for example. The elements that constitute the sub phase 2 are, for example, Sm, Y, Fe, Co, Ti, and Zn.

It is preferable that the sub phase 2 continuously surrounds the main phase 1, as illustrated in FIG. 1. By surrounding the main phase 1, the reverse domain propagation is effectively suppressed to further increase the coercive force. Further, a thickness of the sub phase 2 is not less than 0.5 nm nor more than 100 nm, and more preferably not less than 1 nm nor more than 50 nm. When the sub phase 2 is too thin, the effect brought by the sub phase 2 to suppress the domain wall propagation between the main phases 1 is small. Further, when the sub phase 2 is too thick, a volume of the sub phase 2 is increased, which leads to reduction in magnetization.

The composition of the magnetic material is measured through, for example, inductively coupled plasma-atomic emission spectroscopy (ICP-AES), scanning electron microscope-energy dispersive X-ray spectroscopy (SEM-EDX), transmission electron microscope-energy dispersive X-ray spectroscopy (TEM-EDX), scanning transmission electron microscope-energy dispersive X-ray spectroscopy (STEM-EDX), or the like. The volume ratios of the respective phases are determined in a comprehensive manner by using both of observation with an electron microscope or an optical microscope, and the X-ray diffraction or the like.

The concentrations of the respective elements of the main phase 1, the sub phase 2, and the hetero-phase are measured by using the SEM-EDX, for example. For example, the main phase 1 and the sub phase 2 can be specified by an observation image obtained through the SEM and a mapping image of each element of a measurement sample of the magnetic material obtained through the SEM-EDX.

The main phase 1 and the sub phase 2 are recognized as follows. A SEM-EDX mapping image is photographed at a cross section of the magnetic material. As the cross section of the magnetic material, a cross section of substantially a center portion of a surface having a maximum area of a sample is used. In the SEM, a region of not less than 10 μm×10 μm nor more than 100 μm×100 μm is observed with a magnification of 1000 to 10000, for example. The main phase 1 and the sub phase 2 can be identified based on a concentration change in the constituent element of the main phase 1 and the constituent element of the sub phase 2 in the mapping image of each element. A portion with high concentration of the element X is the sub phase 2, and it is possible to identify an interface between the main phase 1 and the sub phase 2 in the following manner. When a STEM-EDX mapping image in the vicinity of an arbitrary interface between the main phase 1 and the sub phase 2 recognized by the above-described method is observed, and the change in the concentration of the element X is measured from the main phase 1 toward the sub phase 2, a position at which the X concentration is changed rapidly is set as the interface between the main phase 1 and the sub phase 2. The magnification of the mapping image is preferably 10000 to 20000. Subsequently, a straight line which is brought into contact with the interface between the main phase 1 and the sub phase 2 identified by the above-described method is drawn, and a line parallel to the straight line is drawn on an opposite-side interface of the sub phase 2. A distance between the two straight lines is set as a thickness of the sub phase 2. Regarding the thickness of the sub phase 2, an average value obtained by performing measurement on the sub phase 2 which is continued in each visual field at points of 10 places or more that are not overlapped with one another, is set to the thickness of the sub phase 2. In the entire magnetic material, places of 10 visual fields or more which are not overlapped with one another are measured, and an average value of all of the measured results is set to an average thickness of the sub phase 2 of the magnetic material.

An average value of the number of depressions and projections at the interface between the main phase 1 and the sub phase 2 is determined as follows. In a STEM image in a visual field same as the visual field in which the interface between the main phase 1 and the sub phase 2 is identified, three straight lines are drawn from an arbitrary point (reference point) within the main phase 1 separated by 300 nm or more from the interface between the main phase 1 and the sub phase 2 toward the interface between the main phase 1 and the sub phase 2. The three straight lines are the reference line, a line rotated by +θ degree around the reference point from the reference line (+θ line), and a line rotated by −θ degree around the reference point from the reference line (−θ line). Each length of the respective lines is measured, and a difference between the reference line and the −θ line (−Δ) and a difference between the reference line and the +θ line (+Δ) are determined. Here, when a value of Δ does not reach 30 nm, the value is set to 0. When signs of −Δ and +Δ are the same, this is counted as a depression and a projection. A similar operation is performed while rotating the reference line by 2θ around the reference point, thereby measuring the entire interface. When there exists another interface between the reference point and the interface to be measured, the measurement is performed while changing the position of the reference point. The measurement is performed so that the interface does not overlap with the interface which is already measured once. The number of depressions and projections at the continued interface within a visual field is set to the number of depressions and projections at one interface between the main phase 1 and the sub phase 2, the measurement is performed at places of 10 visual fields or more which are not overlapped with one another, and an average value of all of the measured results is set to an average value of the number of depressions and projections at the interface between the main phase 1 and the sub phase 2 of the magnetic material.

The magnetic physical property such as the coercive force of the magnetic material is calculated by using a vibrating sample magnetometer (VSM), for example.

Next, an example of a manufacturing method of the magnetic material of the embodiment will be described. First, an alloy containing predetermined elements required for the magnetic material is manufactured. The alloy can be manufactured by using, for example, an arc melting method, a high-frequency melting method, a metal mold casting method, a mechanical alloying method, a mechanical grinding method, a gas atomizing method, a reduction diffusion method, or the like.

The element X may be contained when manufacturing the alloy, but, it may also be contained through a method of a so-called two-powder method in which a powder obtained by grinding an alloy made of the constituent elements of the main phase 1 and a powder obtained by grinding a simple substance of the element X or an alloy of the element X and an arbitrary constituent element of the main phase 1 are mixed and reacted through heat treatment. The powder of the simple substance of the element X or the alloy of the element X and the arbitrary constituent element of the main phase 1 can be produced by using a grinding machine such as a later-described jet mill or ball mill. Further, it is also possible to use the gas atomizing method or the reduction diffusion method. Alternatively, a powder raw material may be purchased. By using the two-powder method, it is easy to form the sub phase 2 through the reaction between the element X and the main phase 1, and it is easy to improve the coercive force. Here, a manufacturing method of the magnetic material using the two-powder method will be exemplified. Note that it is also possible to adjust the concentration of the element X in the sub phase 2 in accordance with the addition amount of the element X.

The above-described alloy may be melted to be subjected to quenching. This enables to stably obtain the $ThMn_{12}$ crystal phase, and to reduce the precipitation amount of the hetero-phase. The melted alloy is cooled by using a liquid quenching method, for example. In the liquid quenching method, the alloy molten metal is injected to a roll which rotates at a high speed. The roll may be one of either a single-roll type or a twin-roll type, and a material thereof mainly employs copper or the like. By controlling an amount of the molten metal to be injected and a circumferential speed of the rotating roll, it is possible to control a cooling rate of the molten metal. A strip cast method being one of alloy producing methods using quenching can be considered as a liquid quenching method with relatively slow cooling rate. If a quenching rate is increased, there is provided a high effect of making a metal structure of the magnetic material to be manufactured to be fine and uniform.

Heat treatment may also be performed on the above-described alloy or alloy thin strip. This enables to homogenize the material. For example, heating is performed at a temperature of not less than 700° C. nor more than 1300° C. for not less than 5 minutes nor more than 200 hours. Consequently, it is possible to increase the stability of the $ThMn_{12}$ crystal phase.

It is also possible to make the element A enter the above-described alloy. It is preferable that the alloy is ground into a powder before the process of making the element A enter the alloy. When the element A is nitrogen, by heating the alloy for not less than 1 hour nor more than 100 hours in an atmosphere of nitrogen gas, ammonia gas, or the like at about not less than 0.1 atmospheric pressure nor more than 100 atmospheric pressure, at a temperature of not less than 200° C. nor more than 700° C., it is possible to nitride the alloy to make the element N enter the alloy. When the element A is carbon, by heating the alloy for not less than 1 hour nor more than 100 hours in an atmosphere of $C_2H_2$, $CH_4$, $C_3H_8$, or CO gas or thermal decomposition gas of methanol at about not less than 0.1 atmospheric pressure nor more than 100 atmospheric pressure in a temperature range of not less than 300° C. nor more than 900° C., it is possible to carbonize the alloy to make the element C enter the alloy. When the element A is hydrogen, by heating the alloy for 1 to 100 hours in an atmosphere of hydrogen gas, ammonia gas, or the like at about 0.1 to 100 atmospheric pressure, in a temperature range of 200 to 700° C., it is possible to hydrogenate the alloy to make the element H enter the alloy. When the element A is boron, by making a raw material contain boron when manufacturing the alloy, it is possible to make boron to be contained in the alloy. When the element A is phosphorus, by phosphorizing the alloy, it is possible to make the element P enter the alloy.

The above-described alloy is ground by using a grinding machine such as a jet mill or a ball mill, to thereby form an alloy powder made of the constituent elements of the main phase 1. Further, it is also possible to form a powder containing the element X by grinding a simple substance of the element X or the alloy of the element X and an arbitrary constituent element of the main phase 1 by using a grinding machine such as a jet mill or a ball mill in a similar manner. These two kinds or more of powders are mixed at an appropriate mixing ratio to obtain a mixed powder. The mixed powder is pressed at a pressure of about 1 ton and heated at a temperature of not less than 200° C. nor more than 700° C. for not less than 1 minute nor more than 10 hours, to thereby generate the sub phase 2 containing the element X. When the heat treatment temperature is less than 200° C., the reaction between the element X and the main phase 1 does not occur, and it is not possible to form an appropriate sub phase 2. Further, when the temperature exceeds 700° C., the reaction between the element X and the main phase 1 occurs significantly, which leads to decomposition of the main phase 1 or reduction in the coercive force due to increase in the number of depressions and projections at the interface. The temperature range is preferably not less than 250° C. nor more than 650° C., and more preferably not less than 300° C. nor more than 600° C. Further, when the heating time is short, the temperature in the material becomes uneven, resulting in that the sub phase 2 is generated in a non-uniform manner. Further, when the heating time is long, this leads to decomposition of the main phase 1 due to excessive reaction between the element X and the main phase 1 or reduction in the coercive force due to increase in the number of depressions and projections at the interface. The range of the heating time is preferably not less than 2 minutes nor more than 5 hours, and more preferably not less than 5 minutes nor more than 1 hour.

The magnetic material is manufactured through the above-described process. The above-described magnetic material can be directly provided as a permanent magnet. Further, it is also possible to increase the magnetic force by further performing, at the time of pressing, magnetic field orientation pressing in a magnetic field of about 1 to 2 T. Alternatively, the permanent magnet may be manufactured in the following manner by using the aforementioned magnetic material. An example of a magnet manufacturing process will be presented. The aforementioned magnetic material is ground by using a grinding machine such as a jet mill or a ball mill, and subjected to magnetic field orientation pressing in a magnetic field of about 1 to 2 T at a pressure of about 1 ton, to thereby obtain a compact. The obtained compact is heated and sintered in an atmosphere of inert gas such as Ar and in vacuum, to thereby manufacture a sintered body. By properly performing heat treatment on the sintered body in the inert atmosphere or the like, a permanent magnet can be manufactured. Alternatively, by grinding the aforementioned magnetic material, and solidifying the ground substance using a resin or the like, a bond magnet including the aforementioned magnetic material is manufactured.

Second Embodiment

The permanent magnet including the magnetic material of the first embodiment can be used for various motors or a generator. In addition, it can also be used as a stationary magnet or a variable magnet of a variable magnetic flux motor or a variable magnetic flux generator. The various motors and generators are configured by using the permanent magnet of the first embodiment. When the permanent magnet of the first embodiment is applied to the variable magnetic flux motor, the techniques disclosed in Japanese Laid-open Patent Publication No. 2008-29148 and Japanese Laid-open Patent Publication No. 2008-43172 can be applied to the configuration of the variable magnetic flux motor and a drive system, for example.

Figure 4:
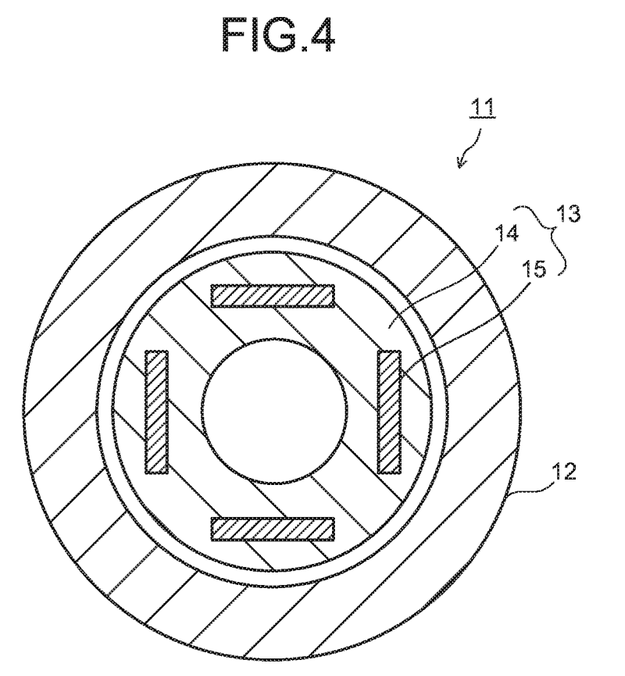
FIG. 4 is a view illustrating an example of a permanent magnet motor.

Next, a motor and a generator including the above-described permanent magnet will be explained with reference to the drawings. FIG. 4 is a view illustrating a permanent magnet motor. In a permanent magnet motor 11 illustrated in FIG. 4, a rotor 13 is disposed in a stator 12. In an iron core 14 of the rotor 13, permanent magnets 15 which are the permanent magnets of the first embodiment are disposed. By using the permanent magnets of the first embodiment, high efficiency, reduction in size, cost reduction and the like of the permanent magnet motor 11 can be achieved based on properties and the like of the respective permanent magnets.

Figure 5:
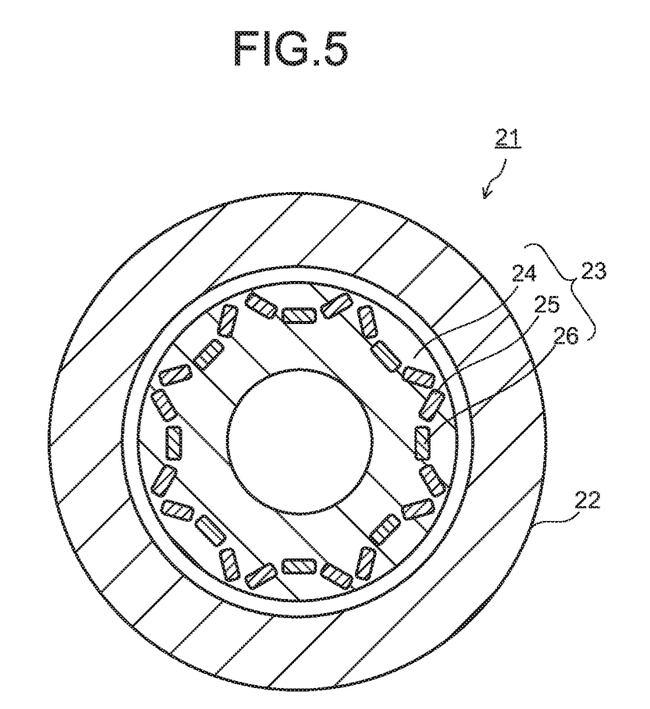
FIG. 5 is a view illustrating an example of a variable magnetic flux motor.

FIG. 5 is a view illustrating a variable magnetic flux motor. In a variable magnetic flux motor 21 illustrated in FIG. 5, a rotor 23 is disposed in a stator 22. In an iron core 24 of the rotor 23, the permanent magnets of the first embodiment are disposed as stationary magnets 25 and variable magnets 26. A magnetic flux density (flux quantum) of the variable magnet 26 is allowed to be variable. The variable magnet 26 is not affected by a Q-axis current but can be magnetized by a D-axis current because a magnetization direction thereof is perpendicular to a Q-axis direction. The rotor 23 is provided with a magnetization winding (not illustrated). There is made the structure in which by passing an electric current from a magnetization circuit to this magnetization winding, its magnetic field acts directly on the variable magnets 26.

According to the permanent magnet of the first embodiment, it is possible to obtain a coercive force suitable for the stationary magnet 25. When the permanent magnet of the first embodiment is applied to the variable magnet 26, it is sufficient that, for example, the coercive force is controlled in a range of not less than 100 kA/m nor more than 500 kA/m by changing manufacturing conditions. Note that in the variable magnetic flux motor 21 illustrated in FIG. 5, the permanent magnet of the first embodiment can be used for both the stationary magnet 25 and the variable magnet 26, and the permanent magnet of the first embodiment may be used for either of the magnets. Because the variable magnetic flux motor 21 is capable of outputting large torque with a small apparatus size, it is suitable for a motor of a hybrid vehicle, an electric vehicle, or the like required to have a high-output and compact motor.

Figure 6:
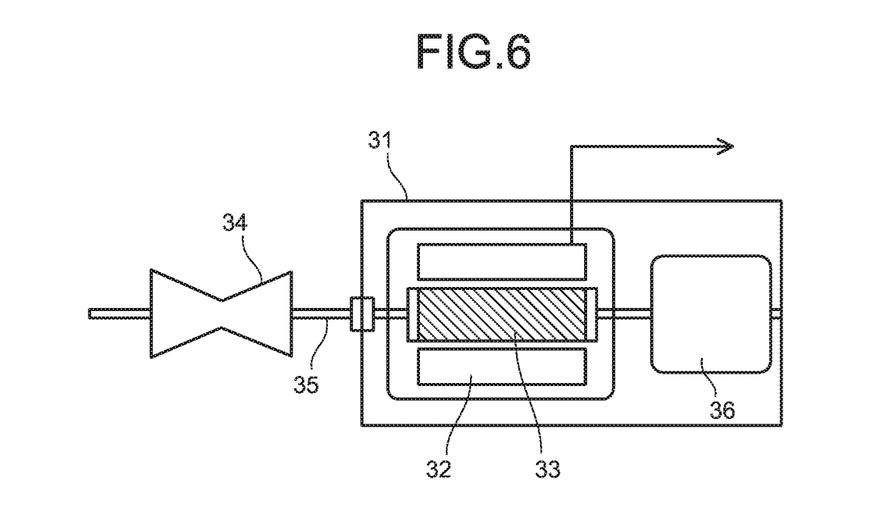
FIG. 6 is a view illustrating an example of a generator.

FIG. 6 illustrates a generator. A generator 31 illustrated in FIG. 6 includes a stator 32 using the above-described permanent magnet. A rotor 33 disposed inside the stator 32 is connected via a shaft 35 to a turbine 34 provided at one end of the generator 31. The turbine 34 is rotated by, for example, fluid supplied from the outside. Note that in place of the turbine 34 rotated by the fluid, the shaft 35 can also be rotated by transferring dynamic rotation such as regenerated energy of an automobile. Various publicly-known configurations can be employed for the stator 32 and the rotor 33.

The shaft 35 is in contact with a commutator (not illustrated) disposed on the opposite side to the turbine 34 with respect to the rotor 33, so that an electromotive force generated by a rotation of the rotor 33 is boosted to a system voltage and is transmitted as an output from the generator 31 via an isolated bus and a main transformer (not illustrated). The generator 31 may be either of an ordinary generator and a variable magnetic flux generator. Note that the rotor 33 generates an electrostatic charge by static electricity from the turbine 34 and an axial current accompanying power generation. Therefore, the generator 31 includes a brush 36 for discharging the electrostatic charge of the rotor 33.

As described above, by applying the above-described permanent magnet to the generator, effects such as high efficiency, downsizing, and low cost are obtained.

Figure 7:
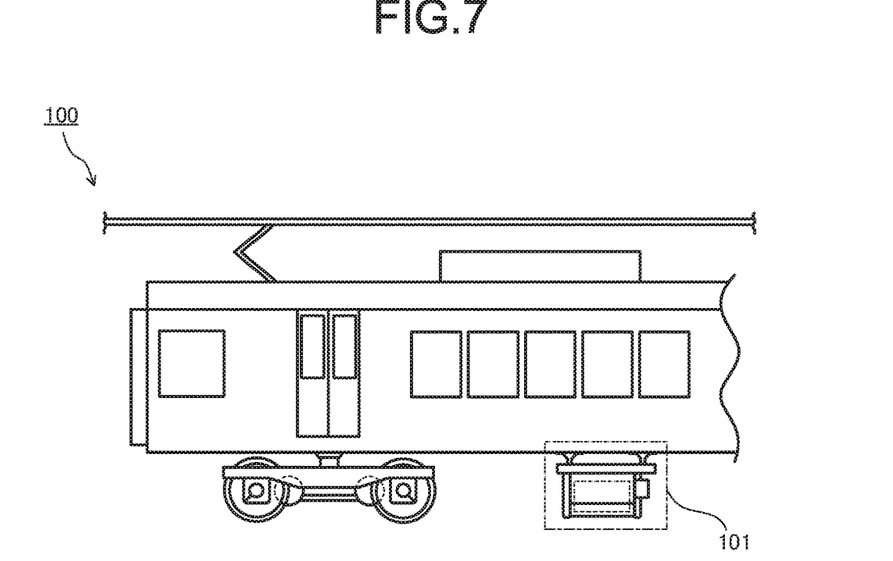
FIG. 7 is a schematic view illustrating a configuration example of a railway vehicle.

The above-described rotary electric machine may be mounted in, for example, a railway vehicle (one example of the vehicle) to be used for railway traffic. FIG. 7 is a view illustrating one example of a railway vehicle 100 including a rotary electric machine 101. As the rotary electric machine 101, any of the motors in FIGS. 4 and 5, the generator in FIG. 6, and the like described above can be used. When the above-described rotary electric machine is mounted as the rotary electric machine 101, the rotary electric machine 101 may be used as, for example, a motor which outputs driving force by using electric power supplied from an overhead wire or electric power supplied from a secondary battery mounted in the railway vehicle 100, or may be used as a generator which converts kinetic energy into electric power and supplies the electric power to various loads in the railway vehicle 100. Using such a high-efficient rotary electric machine as the rotary electric machine of the embodiment allows the railway vehicle to travel in an energy-saving manner.

Figure 8:
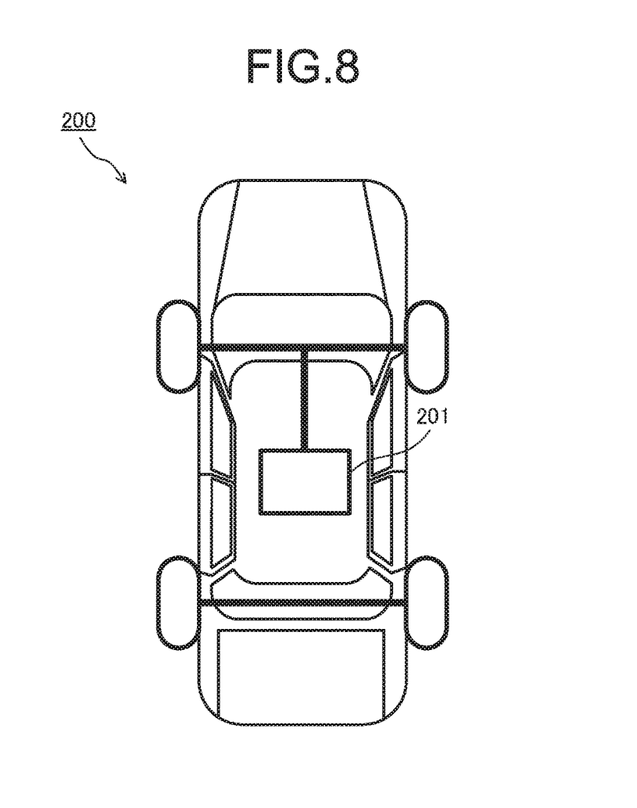
FIG. 8 is a schematic view illustrating a configuration example of an automobile.

The above-described rotary electric machine may be mounted in an automobile (another example of the vehicle) such as a hybrid vehicle or an electric vehicle. FIG. 8 is a view illustrating one example of an automobile 200 including a rotary electric machine 201. As the rotary electric machine 201, any of the motors in FIGS. 4 and 5, the generator in FIG. 6, and the like described above can be used. When the above-described rotary electric machine is mounted as the rotary electric machine 201, the rotary electric machine 201 may be used as a motor which outputs driving force of the automobile 200 or a generator which converts kinetic energy when the automobile 200 travels into electric power. In addition, the above-described rotary electric machine may be mounted in, for example, industrial equipment (industrial motor), an air-conditioning apparatus (air conditioner and water heater compressor motor), a wind power generator, or an elevator (hoist).

EXAMPLES

Example 1

Appropriate amounts of raw materials were weighed to produce an alloy by using the arc melting method. Next, the alloy was melted, and the obtained molten metal was subjected to quenching by using the strip cast method, to thereby produce an alloy thin strip. The above-described alloy thin strip was heated for 20 hours at a temperature of 1100° C. under an Ar atmosphere.

Next, the alloy thin strip was ground by a jet mill to produce an alloy powder. Further, a Zn powder with an average grain diameter of about 3 μm was produced, and the both powders were mixed. After that, pressing was performed at a pressure of 1 ton to form a compact, the compact was subjected to heat treatment at 400° C. for 10 minutes, to thereby obtain a permanent magnet. As a result of performing the SEM-EDX analysis on the obtained permanent magnet, it was confirmed that the permanent magnet includes a metal structure having the $ThMn_{12}$ crystal phase as its main phase, and a sub phase containing Zn. The concentration of the element Zn in the sub phase was calculated from the SEM-EDX analysis. The composition of the magnetic material was evaluated by using the ICP-AES. Further, the coercive force of the permanent magnet was evaluated by using the VSM. Furthermore, the average value of the number of depressions and projections at the interface between the main phase and the sub phase was measured. Results are presented in Table 1.

Example 2

Appropriate amounts of raw materials were weighed to produce an alloy by using the arc melting method. The above-described alloy was heated for 20 hours at a temperature of 1100° C. under an Ar atmosphere.

Next, the alloy was ground by a jet mill to produce an alloy powder. Further, a Zn powder with an average grain diameter of about 3 μm was produced, and the both powders were mixed. After that, pressing was performed in a magnetic field of 1 to 2 T at a pressure of 1 ton to form a compact, the compact was subjected to heat treatment at 450° C. for 5 minutes, to thereby obtain a permanent magnet. As a result of performing the SEM-EDX analysis on the obtained permanent magnet, it was confirmed that the permanent magnet includes a metal structure having the $ThMn_{12}$ crystal phase as its main phase, and a sub phase containing Zn. The concentration of the element Zn in the sub phase was calculated from the SEM-EDX analysis. The composition of the magnetic material was evaluated by using the ICP-AES. Further, the coercive force of the permanent magnet was evaluated by using the VSM. Furthermore, the average value of the number of depressions and projections at the interface between the main phase and the sub phase was measured. Results are presented in Table 1.

Example 3

Appropriate amounts of raw materials were weighed to produce an alloy by using the arc melting method. Next, the alloy was melted, and the obtained molten metal was injected to a single roll made of copper and rotating at 10 m/s, to thereby perform quenching at a speed faster than that of the strip cast method and produce an alloy thin strip. The above-described alloy thin strip was heated for 1 hour at a temperature of 1000° C. under an Ar atmosphere.

Next, the alloy thin strip was ground by a jet mill to produce an alloy powder. Further, a Zn powder with an average grain diameter of about 3 μm was produced, and the both powders were mixed. After that, pressing was performed at a pressure of 1 ton to form a compact, the compact was subjected to heat treatment at 350° C. for 30 minutes, to thereby obtain a permanent magnet. As a result of performing the SEM-EDX analysis on the obtained permanent magnet, it was confirmed that the permanent magnet includes a metal structure having the $ThMn_{12}$ crystal phase as its main phase, and a sub phase containing Zn. The concentration of the element Zn in the sub phase was calculated from the SEM-EDX analysis. The composition of the magnetic material was evaluated by using the ICP-AES. Further, the coercive force of the permanent magnet was evaluated by using the VSM. Furthermore, the average value of the number of depressions and projections at the interface between the main phase and the sub phase was measured. Results are presented in Table 1.

Example 4

Appropriate amounts of raw materials were weighed to produce an alloy by using the arc melting method. Next, the alloy was melted, and the obtained molten metal was subjected to quenching by using the strip cast method, to thereby produce an alloy thin strip. The above-described alloy thin strip was heated for 25 hours at a temperature of 1000° C. under an Ar atmosphere.

Next, the alloy thin strip was ground by a jet mill to produce an alloy powder. Further, a Sn powder with an average grain diameter of about 3 μm was produced, and the both powders were mixed. After that, pressing was performed at a pressure of 1 ton to form a compact, the compact was subjected to heat treatment at 300° C. for 5 minutes, to thereby obtain a permanent magnet. As a result of performing the SEM-EDX analysis on the obtained permanent magnet, it was confirmed that the permanent magnet includes a metal structure having the $ThMn_{12}$ crystal phase as its main phase, and a sub phase containing Sn. The concentration of the element Zn in the sub phase was calculated from the SEM-EDX analysis. The composition of the magnetic material was evaluated by using the ICP-AES. Further, the coercive force of the permanent magnet was evaluated by using the VSM. Furthermore, the average value of the number of depressions and projections at the interface between the main phase and the sub phase was measured. Results are presented in Table 1.

Example 5

Appropriate amounts of raw materials were weighed to produce an alloy by using the arc melting method. Next, the alloy was melted, and the obtained molten metal was subjected to quenching by using the strip cast method, to thereby produce an alloy thin strip. The above-described alloy thin strip was heated for 25 hours at a temperature of 1000° C. under an Ar atmosphere.

Next, the alloy thin strip was ground by a jet mill to produce an alloy powder. Further, an alloy of a Sm—Cu intermetallic compound was produced, the alloy was ground by a jet mill to obtain a Sm—Cu powder. The both powders were mixed and then pressed at a pressure of 1 ton to obtain a compact, and after that, the compact was subjected to heat treatment at a temperature of 500° C. for 30 minutes, to thereby obtain a permanent magnet. As a result of performing the SEM-EDX analysis on the obtained permanent magnet, it was confirmed that the permanent magnet includes a metal structure having the $ThMn_{12}$ crystal phase as its main phase, and a sub phase containing Cu. The concentration of the element Zn in the sub phase was calculated from the SEM-EDX analysis. The composition of the magnetic material was evaluated by using the ICP-AES. Further, the coercive force of the permanent magnet was evaluated by using the VSM. Furthermore, the average value of the number of depressions and projections at the interface between the main phase and the sub phase was measured. Results are presented in Table 1.

Example 6

Appropriate amounts of raw materials were weighed to produce an alloy by using the arc melting method. The above-described alloy was heated for 50 hours at 1100° C. under an Ar atmosphere.

Next, the alloy was ground by a jet mill to produce an alloy powder. Further, a Zn powder with an average grain diameter of about 3 μm was produced, and the both powders were mixed. After that, pressing was performed in a magnetic field of 1 to 2 T at a pressure of 1 ton to form a compact, the compact was subjected to heat treatment at a temperature of 400° C. for 15 minutes, to thereby obtain a permanent magnetic material.

Next, the permanent magnetic material was ground by a jet mill to produce an alloy powder, and a permanent magnet was obtained by using a spark plasma sintering (SPS) method after molding in a magnetic field. As a result of performing the SEM-EDX analysis on the obtained permanent magnet, it was confirmed that the permanent magnet includes a metal structure having the $ThMn_{12}$ crystal phase as its main phase, and a sub phase containing Zn. The concentration of the element Zn in the sub phase was calculated from the SEM-EDX analysis. The composition of the magnetic material was evaluated by using the ICP-AES. Further, the coercive force of the permanent magnet was evaluated by using the VSM. Furthermore, the average value of the number of depressions and projections at the interface between the main phase and the sub phase was measured. Results are presented in Table 1.

Comparative Example 1

Appropriate amounts of raw materials were weighed to produce an alloy by using the arc melting method. Next, the alloy was melted, and the obtained molten metal was subjected to quenching by using the strip cast method, to thereby produce an alloy thin strip. The above-described alloy thin strip was heated for 20 hours at a temperature of 1000° C. under an Ar atmosphere.

Next, the alloy thin strip was ground by a jet mill to produce an alloy powder, and a permanent magnet was obtained by molding in a magnetic field and heat treatment. As a result of performing the SEM-EDX analysis on the obtained permanent magnet, it was confirmed that the permanent magnet has the $ThMn_{12}$ crystal phase as its main phase, but does not have a sub phase containing the element X. Further, the coercive force of the permanent magnet was evaluated by using the VSM. Results are presented in Table 1.

Comparative Example 2

Appropriate amounts of raw materials were weighed to produce an alloy by using the arc melting method. Next, the alloy was melted, and the obtained molten metal was subjected to quenching by using the strip cast method, to thereby produce an alloy thin strip. The above-described alloy thin strip was heated for 25 hours at a temperature of 1000° C. under an Ar atmosphere.

Next, the alloy thin strip was ground by a jet mill to produce an alloy powder. Further, a Sn powder with an average grain diameter of about 3 μm was produced, and the both powders were mixed. After that, pressing was performed at a pressure of 1 ton to obtain a compact, the compact was subjected to heat treatment at 600° C. for 30 minutes, to thereby obtain a permanent magnet. As a result of performing the SEM-EDX analysis on the obtained permanent magnet, it was confirmed that the permanent magnet includes a metal structure having the $ThMn_{12}$ crystal phase as its main phase, and a sub phase containing Sn. The concentration of the element Zn in the sub phase was calculated from the SEM-EDX analysis. The composition of the magnetic material was evaluated by using the ICP-AES. Further, the coercive force of the permanent magnet was evaluated by using the VSM. Furthermore, the average value of the number of depressions and projections at the interface between the main phase and the sub phase was measured. Results are presented in Table 1.

TABLE 1

| | Composition of Magnetic Material | Zn Concentration in Sub Phase (atomic %) | Coercive Force of Permanent Magnet | Average Value of Number of Depressions and Projections at Interface Between Main Phase and Sub Phase |
|---|---|---|---|---|
| Example 1 | $(Sm_{0.8}Y_{0.2})_{7.8}(Fe_{0.8}Co_{0.2})_{87.0}Ti_{3.7}Zn_{1.5}$ | 68 | Very good | 113 |
| Example 2 | $(Sm_{0.8}Y_{0.2})_{7.8}(Fe_{0.8}Co_{0.2})_{87.2}Ti_{3.8}Zn_{1.2}$ | 66 | Very good | 84 |
| Example 3 | $(Sm_{0.8}Y_{0.2})_{8.0}(Fe_{0.8}Co_{0.2})_{87.3}Ti_{3.9}Zn_{0.8}$ | 62 | Very good | 48 |
| Example 4 | $(Sm_{0.8}Y_{0.2})_{8.0}(Fe_{0.8}Co_{0.2})_{87.2}Ti_{4.0}Zn_{0.8}$ | 0 | Good | 310 |
| Example 5 | $(Sm_{0.7}Y_{0.3})_{8.5}(Fe_{0.7}Co_{0.3})_{86.7}Nb_{3.7}Cu_{1.1}$ | 0 | Good | 248 |
| Example 6 | $(Sm_{0.8}Y_{0.2})_{7.8}(Fe_{0.8}Co_{0.2})_{87.0}Ti_{3.7}Zn_{1.5}$ | 65 | Very good | 103 |
| Comp. Exam. 1 | $(Sm_{0.8}Y_{0.2})_{7.5}(Fe_{0.8}Co_{0.2})_{88.5}Ti_{4.0}$ | — | Bad | — |
| Comp. Exam. 2 | $(Sm_{0.8}Y_{0.2})_{8.0}(Fe_{0.8}Co_{0.2})_{87.2}Ti_{4.0}Sn_{0.8}$ | 0 | Bad | 736 |

In each of Examples 1 to 6, and Comparative examples 1 and 2, it was determined to be "Good" when the coercive force increased 50% or more and 200% or less, and it was determined to be "Very Good" when the coercive force increased over 200% with respect to the coercive force of Comparative example 1 when the coercive force of Comparative example 1 was set as "Bad". As it is clear from Table 1, in each of the permanent magnets of Examples 1 to 6, the sub phase containing the element X was formed, the number of depressions and projections at the interface between the main phase and the sub phase was small, and the improvement of the coercive force was confirmed. Particularly, in each of Examples 1 to 3 and 6, Zn of 50 atomic percent or more was contained in the sub phase, and the effect of improving the coercive force was large. On the contrary, in the magnetic material of Comparative example 1, there was no sub phase containing the element X, and the coercive force was not exhibited almost at all. Further, in the magnetic material of Comparative example 2, although the sub phase containing Sn was formed, the number of depressions and projections at the interface between the main phase and the sub phase was large, and the coercive force was not improved.

Note that the above-described embodiments have been presented by way of examples and are not intended to limit the scope of the invention. These novel embodiments can be implemented in a variety of other modes, and various omissions, substitutions, and modifications thereof can be made within the scope that does not depart from the spirit of the invention. Such embodiments and modifications thereof are encompassed by the scope and the spirit of the invention and also encompassed by the invention set forth in the claims and equivalents thereof.

What is claimed is:

1. A magnetic material expressed by
a composition formula 1: $(R_{1-x}Y_x)_a M_b T_c Zn_d$
where R is at least one element selected from the group consisting of rare-earth elements, M is Fe or Fe and Co, T is at least one element selected from the group consisting of Ti, V, Nb, Ta, Mo, and W, x is a number satisfying $0.01 \leq x \leq 0.8$ atomic percent, a is a number satisfying $4 \leq a \leq 20$ atomic percent, b is a number satisfying b=100−a−c−d atomic percent, c is a number satisfying $0<c<7$ atomic percent, d is a number satisfying $0.01 \leq d \leq 7$ atomic percent,
the magnetic material comprising:
a main phase having a $ThMn_{12}$ crystal phase; and
a sub phase containing 62 atomic percent or more of Zn, and
wherein an average thickness of the sub phase is not less than 0.5 nm nor more than 100 nm.

2. The magnetic material according to claim 1, wherein 50 atomic percent or more of the element R is Sm.

3. The magnetic material according to claim 1, wherein the magnetic material contains at least one element selected from the group consisting of N, C, B, H, and P.

4. The magnetic material according to claim 3, wherein 50 atomic percent or more of the element R is at least one element selected from the group consisting of Ce, Pr, Nd, Tb, and Dy.

5. The magnetic material according to claim 1, wherein 50 atomic percent or less of the element Y is replaced with at least one element selected from the group consisting of Zr and Hf.

6. The magnetic material according to claim 1, wherein 50 atomic percent or more of the element T is Ti or Nb.

7. The magnetic material according to claim 1, wherein 20 atomic percent or less of the element M is replaced with at least one element selected from the group consisting of Al, Si, Cr, Mn, Ni, and Ga.

8. A magnetic material expressed by
a composition formula 1: $(R_{1-x}Y_x)_a M_b T_c X_d$
where R is at least one element selected from the group consisting of rare-earth elements, M is Fe or Fe and Co, T is at least one element selected from the group consisting of Ti, V, Nb, Ta, Mo, and W, X is at least one element selected from the group consisting of Zn, Sn and In, x is a number satisfying $0.01 \leq x \leq 0.8$ atomic percent, a is a number satisfying $4 \leq a \leq 20$ atomic percent, b is a number satisfying b=100−a−c−d atomic percent, c is a number satisfying $0<c<7$ atomic percent, and d is a number satisfying $0.01 \leq d \leq 7$ atomic percent,
the magnetic material comprising:
a main phase having a $ThMn_{12}$ crystal phase; and
a sub phase containing the element X, wherein an average value of the number of depressions and projections at an interface between the main phase and the sub phase is 310 or less, the average value being measured by observing a region in a cross section of the magnetic material using a scanning electron microscope, and the region being observed with a magnification of 1000 to 10000 and having an area of not less than 10 μm x 10 μm nor more than 100 μm x 100 μm, and
wherein an average thickness of the sub phase is not less than 0.5 nm nor more than 100 nm.

9. The magnetic material according to claim 8, wherein 50 atomic percent or more of the element R is Sm.

10. The magnetic material according to claim 8, wherein the magnetic material contains at least one element selected from the group consisting of N, C, B, H, and P.

11. The magnetic material according to claim 10, wherein 50 atomic percent or more of the element R is at least one element selected from the group consisting of Ce, Pr, Nd, Tb, and Dy.

12. The magnetic material according to claim 8, wherein 50 atomic percent or less of the element Y is replaced with at least one element selected from the group consisting of Zr and Hf.

13. The magnetic material according to claim 8, wherein 50 atomic percent or more of the element T is Ti or Nb.

14. The magnetic material according to claim 8, wherein 20 atomic percent or less of the element M is replaced with at least one element selected from the group consisting of Al, Si, Cr, Mn, Ni, and Ga.

15. The magnetic material according to claim 1, wherein a total amount of at least one hetero-phase selected from the group consisting of an α-(Fe, Co) phase and an a-Fe phase is 10 volume percent or less.

16. The magnetic material according to claim 1, wherein the sub phase surrounds the main phase.

17. A permanent magnet, comprising the magnetic material according to claim 1.

18. A permanent magnet, comprising a sintered body of the magnetic material according to claim 1.

19. A rotary electric machine, comprising:
a stator; and
a rotor, wherein
the stator or the rotor has the permanent magnet according to claim 18.

20. The rotary electric machine according to claim 19, wherein the rotor is connected to a turbine via a shaft.

21. A vehicle, comprising the rotary electric machine according to claim 19.

22. The vehicle according to claim 21, wherein:
the rotor is connected to a shaft; and
rotation is transmitted to the shaft.

* * * * *